(12) United States Patent
Shinozaki

(10) Patent No.: US 8,081,977 B2
(45) Date of Patent: Dec. 20, 2011

(54) MOBILE COMMUNICATION NETWORK

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/470,734

(22) Filed: May 22, 2009

(65) Prior Publication Data

US 2009/0233599 A1    Sep. 17, 2009

Related U.S. Application Data

(62) Division of application No. 11/002,870, filed on Dec. 2, 2004, now Pat. No. 7,599,700.

(30) Foreign Application Priority Data

Aug. 30, 2004  (JP) ................................. 2004-250148

(51) Int. Cl.
*H04W 4/00* (2009.01)

(52) U.S. Cl. ............... 455/435.1; 455/432.1; 455/432.2; 455/435.2; 455/436; 455/443

(58) Field of Classification Search ............... 455/435.1, 455/435.2, 456.1–456.6, 432.3, 435.3, 432.1, 455/432.2, 436, 443, 444
See application file for complete search history.

(56) References Cited

U.S. PATENT DOCUMENTS

| | | | |
|---|---|---|---|
| 5,212,822 A | 5/1993 | Fukumine et al. | |
| 5,384,824 A | 1/1995 | Alvesalo | |
| 5,629,975 A | 5/1997 | Tiedemann, Jr. et al. | |
| 5,640,443 A * | 6/1997 | Kamura | 455/433 |
| 5,732,350 A | 3/1998 | Marko et al. | |
| 5,898,923 A | 4/1999 | Gaasvik et al. | |
| 5,937,350 A | 8/1999 | Frank | |
| 6,198,927 B1 | 3/2001 | Wright et al. | |
| 6,272,344 B1 * | 8/2001 | Kojima | 455/435.1 |
| 6,314,282 B1 | 11/2001 | Weber et al. | |
| 6,330,446 B1 * | 12/2001 | Mori | 455/435.2 |
| 6,671,621 B2 | 12/2003 | Chen et al. | |
| 6,868,270 B2 | 3/2005 | Dent | |
| 6,978,135 B2 * | 12/2005 | Sasada | 455/435.1 |
| 6,983,156 B2 | 1/2006 | Fukushima et al. | |
| 7,058,410 B2 | 6/2006 | Hiyama et al. | |

(Continued)

FOREIGN PATENT DOCUMENTS

EP           1 237 389           9/2002

(Continued)

OTHER PUBLICATIONS

European Search Report dated Dec. 12, 2005, from the corresponding European Application.

(Continued)

*Primary Examiner* — Olumide T Ajibade Akonai
(74) *Attorney, Agent, or Firm* — Katten Muchin Rosenman LLP

(57) ABSTRACT

A mobile communication network comprising a plurality of base stations and a plurality of mobile machines, the unit for supplying particular location information assigned to a predetermined particular area in advance to the mobile machines moving in the particular area and the mobile machines conduct location registration to the base station side by using the particular location information at a time when the mobile machine enters in the particular area, thereby, increase of load on a network and of power consumption, and quality deteriorations of transmission paths, due to location registration when many users carrying the mobile machines move on a train or the like can be prevented.

8 Claims, 32 Drawing Sheets

U.S. PATENT DOCUMENTS

| | | | |
|---|---|---|---|
| 7,085,567 B1 * | 8/2006 | Rajaniemi | 455/435.1 |
| 7,171,216 B1 | 1/2007 | Choksi | |
| 2002/0086680 A1 | 7/2002 | Hunzinger | |
| 2002/0138195 A1 * | 9/2002 | Watanabe | 701/207 |
| 2003/0092443 A1 | 5/2003 | Hiyama et al. | |
| 2004/0110515 A1 | 6/2004 | Blumberg et al. | |
| 2004/0132463 A1 | 7/2004 | Berg et al. | |
| 2004/0235496 A1 | 11/2004 | Hiyama et al. | |

FOREIGN PATENT DOCUMENTS

| | | |
|---|---|---|
| EP | 1 460 869 | 9/2004 |
| JP | 884363 | 3/1996 |
| JP | 9130859 | 5/1997 |
| JP | 11-7562 | 1/1999 |
| JP | 11-355835 | 12/1999 |
| JP | 2000-23234 | 1/2000 |
| JP | 2000-152314 | 5/2000 |
| JP | 2001-169332 | 6/2001 |
| JP | 2001241964 | 9/2001 |
| JP | 2002-142243 | 5/2002 |
| JP | 2002-152804 | 5/2002 |
| JP | 2002-165255 | 6/2002 |
| JP | 2002-300632 | 10/2002 |
| JP | 2003-16183 | 1/2003 |
| JP | 2003134552 | 5/2003 |
| JP | 2004-120612 | 4/2004 |
| JP | 2004-229078 | 8/2004 |
| WO | 99/56491 | 11/1999 |

OTHER PUBLICATIONS

Communication pursuant to Article 96(2) EPC dated May 30, 2006, from the corresponding European Application.

Notice of Rejection Ground dated Jan. 20, 2009, from the corresponding Japanese Application.

Notice of Rejection Grounds dated May 24, 2011, and Partial English translation thereof, from the corresponding Japanese Application No. 2009-155005.

U.S. Notice of Allowance dated Jul. 24, 2009, from the corresponding parent application U.S. Appl. No. 11/002,870.

* cited by examiner

1> UE OBTAINS INFORMATION ABOUT WHETHER OR NOT Moving Network EXISTS AROUND UE BY RECEIVING REPORT INFORMATION (SIB#n) FROM Node B
1> WHEN Moving Network EXISTS:
2>     WHEN IT IS DETERMINED THAT JOINING IN MN IS POSSIBLE:
3>         CONDUCT SEARCHING OF Moving Network
1> WHEN Moving Network DOES NOT EXIST:
2>     DO NOT CONDUCT ANY PROCESSING

FIG. 8

1> WHEN IT IS DETERMINED THAT JOINING IN MN IS POSSIBLE:
2>     RECEIVE REPORT INFORMATION OF Moving Network USING OBTAINED PARAMETERS
2>     WHEN UE CAN RECEIVE INFORMATION:
3>         UE CONDUCTS PROCESSING FOR JOINING IN Moving Network
2>     WHEN UE CAN NOT RECEIVE INFORMATION:
3>         UE CONDUCTS PROCESSING AGAIN.

FIG. 9

1> RECEIVE SYSTEM INFORMATION REPORTED FROM Moving Network
2>     UE DETERMINES WHETHER OR NOT IT JOINS IN MN
2>     WHEN UE JOINS:
3>         REGISTER BY $LA_{MN}/RA_{MN}$ INCLUDED IN Moving Network
2>     WHEN UE DOES NOT JOIN:
3>         DO NOT CONDUCT ANY PROCESSING

F I G. 1 0

| SIB | CONTENTS | REMARKS |
|---|---|---|
| SIB#n | · EXISTENCE/INEXISTENCE OF MN<br>· Scrambling Code OF PCCPCH$_{MN}$ INCLUDING SIB#n+1<br>· Offset INFORMATION<br>  (Frame Offset, Chip Offset AND THE LIKE)<br>· Pilot Pattern INFORMATION<br>· OTHERS | MN CONCERNING INFORMATION REPORTED FROM Node B |
| SIB#n+1 | MN INFORMATION<br>· LA$_{MN}$/RA$_{MN}$ (LA$_i$/RA$_i$ CAN BE LISTED ALSO)<br>· TYPE OF MN (GPS AND/OR Pilot Channel IS USED AS TIMING OF LEAVING)<br>· LEAVING Point INFORMATION (GPS INFORMATION)<br>· NOTIFYING SIGNAL OF OCCURRENCE OF CHANGE OF LEAVING Point<br>· OTHERS | MN CONCERNING INFORMATION REPORTED FROM MN |

FIG. 11

| UE | CONVENTIONAL LOCATION REGISTRATION INFORMATION | MN REGISTRATION INFORMATION | VALIDITY/ INVALIDITY OF MN | CORRESPONDING LA/RA INFORMATION |
|---|---|---|---|---|
| 1 | LA#0 | LAMN#0 | | LA#0, #5, #7 |
| | RA#0 | RAMN#0 | | RA#0, #5, #7 |
| 2 | LA#1 | LAMN#1 | | LA#0, #1, #3, #8 |
| | RA#1 | RAMN#1 | | RA#0, #1, #3, #8 |

F I G. 1 5

| UE | CONVENTIONAL LOCATION REGISTRATION INFORMATION | MN REGISTRATION INFORMATION | VALIDITY/ INVALIDITY OF MN |
|---|---|---|---|
| 1 | LA#0 | LAMN#0 | |
| | RA#0 | RAMN#0 | |
| 2 | LA#1 | LAMN#1 | |
| | RA#1 | RAMN#1 | |

FIG. 16

| MN REGISTRATION INFORMATION | CORRESPONDING LA/RA INFORMATION |
|---|---|
| $LA_{MN}\#0$ | LA#0, #5, #7 |
| $RA_{MN}\#0$ | RA#0, #5, #7 |
| $LA_{MN}\#1$ | LA#0, #1, #3, #8 |
| $RA_{MN}\#1$ | RA#0, #1, #3, #8 |

FIG. 17

| RNC | MN REGISTRATION INFORMATION | CORRESPONDING LA/RA INFORMATION |
|---|---|---|
| #0 | $LA_{MN}\#0$ | LA#0, #5, #7 |
|  | $RA_{MN}\#0$ | RA#0, #5, #7 |
| #1 | $LA_{MN}\#1$ | LA#0, #1, #3, #8 |
|  | $RA_{MN}\#1$ | RA#0, #1, #3, #8 |

FIG. 18

| Entry1 | Entry2 | Entry3 | Entry4 | Entry5 | Entry6 |
|---|---|---|---|---|---|
| $x_{111}, y_{111}$ | $x_{211}, y_{211}$ | $x_{311}, y_{311}$ | $x_{411}, y_{411}$ | $x_{511}, y_{511}$ | $x_{611}, y_{611}$ |
| $x_{112}, y_{121}$ | $x_{212}, y_{221}$ | $x_{312}, y_{321}$ | $x_{412}, y_{421}$ | $x_{512}, y_{521}$ | $x_{612}, y_{621}$ |
| $x_{121}, y_{112}$ | $x_{221}, y_{212}$ | $x_{321}, y_{312}$ | $x_{421}, y_{412}$ | $x_{521}, y_{512}$ | $x_{621}, y_{612}$ |
| $x_{122}, y_{122}$ | $x_{222}, y_{222}$ | $x_{322}, y_{322}$ | $x_{422}, y_{422}$ | $x_{522}, y_{522}$ | $x_{622}, y_{622}$ |

| TIMING (Hex) | LEAVING Point (Hex) |
|---|---|
| Cell #AB | 15, 1F, 3F, 4B, |
| Cell #57 | 5A, 5E, 66, 71, 7E |
| Cell #7C | 8B, 9C, AA, AC |

FIG. 22

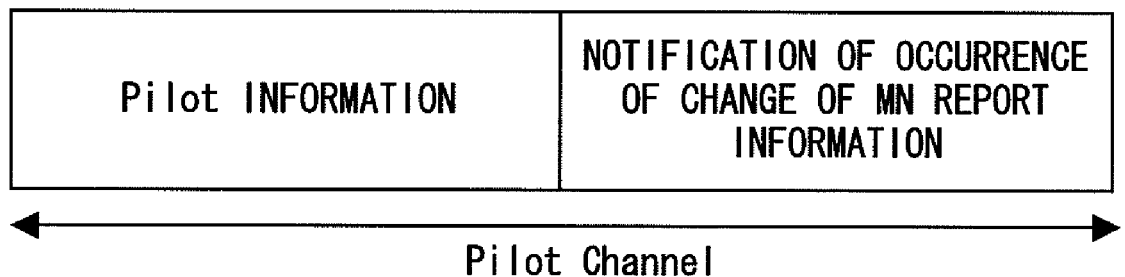
F I G. 2 3

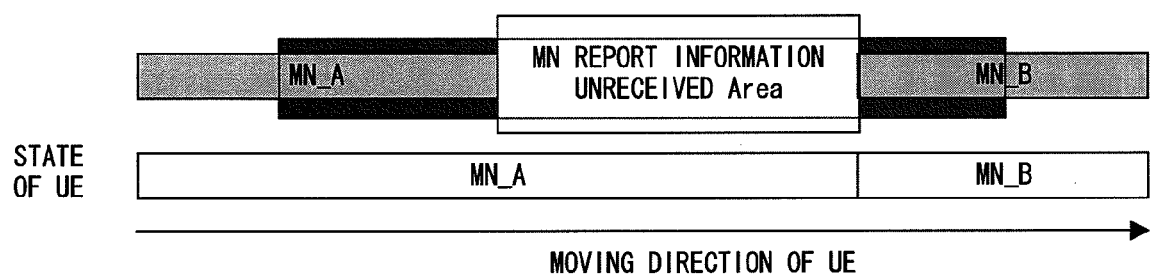
F I G. 2 9

```
1>  MONITOR Pilot CHANNEL AND LEAVING AREA REPORTED FROM MN DEVICE
2>      WHEN MOBILE MACHINE CAN NOT RECEIVE Pilot CHANNEL:
3>          WHEN MOBILE MACHINE IS NOT IN LEAVING AREA:
4>              HOLD THE STATE
3>          WHEN MOBILE MACHINE IS IN LEAVING AREA:
4>              LEAVE MN (CONDUCT LOCATION REGISTRATION BY CONVENTIONAL LOCATION
                INFORMATION)
2>      WHEN MOBILE MACHINE IS IN LEAVING AREA:
3>          WHEN MOBILE MACHINE CAN RECEIVE Pilot CHANNEL:
4>              HOLD THE STATE
3>          WHEN MOBILE MACHINE CAN NOT RECEIVE Pilot CHANNEL:
4>              LEAVE MN (CONDUCT LOCATION REGISTRATION BY CONVENTIONAL LOCATION
                INFORMATION)
```

FIG. 31

MOBILE COMMUNICATION NETWORK

CROSS REFERENCED TO RELATED APPLICATION

This application is a divisional of U.S. application Ser. No. 11/002,870 filed on Dec. 2, 2004, now pending and claims priority from Japanese Patent Application 2004-250148 filed on Aug. 30, 2004, the contents of which are herein incorporated by reference.

BACKGROUND OF THE INVENTION

1. Field of the Invention

The present invention relates to a method of location registration to base station side conducted by mobile machines in a mobile communication network, and more particularly to a mobile communication network using a moving network, in which, when users carrying mobile machines move on a train or the like, location registration is conducted by using particular location information assigned to a particular area in advance without using conventional location information.

2. Description of the Related Art

In a mobile communication system, when transmission is conducted to a particular mobile machine existing in a service area, an operation is conducted in which an area including the location of the mobile machine in the service area is specified to some extent and only base stations in the specified area make a call for the mobile machine.

For the above reason, mobile machines have to register the locations thereof to a network side such as a core network side in advance. And this operation is called location registration, and an area serving as a unit of the location registration is called a location registration area.

Each mobile machine has to conduct location registration to such a network side as a core network side as it enters in another location registration area as it moves. In order to conduct such location registration, each mobile machine stores location registration area information of the current location thereof, monitors the change of the location registration area information as the mobile machine enters in another radio zone and transmits new a location registration signal to a core network side when the change of the information is detected. The word "radio zone" used here means an area which a radio signal from one base station can cover. And one location registration area consists of a plurality of radio zones generally.

The following publications disclose techniques of location registration, method of setting location registration areas, method of switching to a train travel mode, and a mobile phone system in a toll road, in mobile communication systems.

In Japanese unexamined patent application publication No. 11-7562, a mobile phone system in a toll road is disclosed in which a cost of equipments can be reduced by employing a configuration in which installations of special devices dedicated for the collection of the tolls is made unnecessary just by installing wireless base stations at the entrances and the exits of the toll roads utilizing the existing mobile phone system.

In Japanese unexamined patent application publication No. 11-355835, a method of location registration is disclosed in which, when mobile machines exist in a traveling space such as a bus or a train, and move together with the traveling space, location registration operations of a plural mobile machines (for example, n mobile machines) in the traveling space are represented by the location registration of the traveling space by updating registered locations of the mobile machines depending on the update of location registration of the traveling space so that the frequency of the location registration can be reduced to 1/n.

In Japanese unexamined patent application publication No. 2000-23234, a technique is disclosed in which the frequency of the location registration by each mobile communication terminal is reduced by setting areas with high percentage that the mobile communication terminals are in the area for respective mobile communication terminals as logical location registration areas so that load of location registration processings in a mobile communication system can be reduced.

In Japanese unexamined patent application publication No. 2000-152314, a technique is disclosed in which, when there is a difference between location information Pb reported from a base station in a microcell system and location information Pa reported from a base station for a mobile phone service, the location information Pb is transmitted to a switching machine of a mobile phone so that location of mobile terminals in a radio zone corresponding to a base station in a microcell system can be detected.

In Japanese unexamined patent application publication No. 2001-169332, a technique is disclosed in which dynamic traffic information of mobile machines is collected and when the frequency of location registration request exceeds a predetermined value, an area to be registered as a destination is incorporated in a registered current area so that new location registration request is prevented from occurring.

In Japanese unexamined patent application publication No. 2002-165255, a technique is disclosed in which a plurality of division patterns for dividing a communication service area into a plurality of location areas and mobile machines select division patterns according to their mobile characteristics in order to conduct location registration so that loss of traffic concerning the location registration and receiving can be avoided.

In Japanese unexamined patent application publication No. 2002-300632, a technique is disclosed in which it is certainly determined that users carrying mobile machines are on a train, and the mobile machines are turned off or the modes thereof are switched into a manner mode or train travel mode or the like, based on the determination.

However, in the above techniques there is a problem that when users carrying mobile machines move for a long distance on a public conveyances such as a train, a bus or an airplane, location registration of a large number of mobile machines carried by the users on the conveyances simultaneously occurs inevitably every time as the mobile machines enter in another location registration area. This problem occurs similarly when users carrying mobile machines move on a speedway on automobiles. Although, many location registration areas are provided respectively corresponding to traveling routes and speedways for trains and automobiles, the location registration areas can be defined as sets in advance.

As described above, when users carrying mobile machines move on a train for example, there are three problems. The first problem is that there is an increased load on a network by location registration accompanied with movement of mobile machines. The second problem is that the power consumption of mobile machine side and network side is increased by the location registration. The third problem is that quality of wireless transmission path for other mobile machines is deteriorated due to the location registration. These problems are further explained, referring to FIGS. 1 to 3.

In 3GPP (Third Generation Partnership Project) as an organization for establishing specifications of the third generation mobile communication system, an expanded version of W-CDMA (Wideband Code Division Multiple Access) system for wireless access system and an expanded version of GSM (Global System for Mobile Communication) for core network system are employed. And in this 3GPP specification, wireless communication service area is defined by location areas LA for a plurality of circuit switches (CS) or routing areas RA for packet switch (PS) and location information is managed by core network side. For example, when transmitting to a mobile machine, a paging request is issued to a radio network controller (RNC) existing among a core network and base stations by using the managed location information in the core network. The RNC conducts paging for the area to be reported about the request of receiving, corresponding to the paging request.

FIG. 1 explains a relationship between location areas LA and routing areas RA in a 3GPP system. In FIG. 1, one LA contains one or more RAs generally. Each of one or more LAs is managed by a mobile switching center (MSC). Also, each of one or more RAs is managed by a subscriber node SGSN (serving GPRS support node).

FIG. 2 explains location registration processings along the traveling route of a train or the like. When many users carrying mobile machines move on a train in a mobile communication network, many mobile machines conduct location registration for changing location information LA/RA at once. Accordingly, there occurs an instantaneous increase of load due to these location registrations in the mobile communication network and the core network.

FIG. 3 explains quality deterioration of wireless transmission path due to an increase of a frequency of location registration. In FIG. 3, it is shown that increase of both of frequency of location registration and power consumption simultaneously occurs, corresponding to the travel of a train or the like at a time, that is, a time when the train passes the location registration occurring point. In other words, accompanied with a rapid increase of location registration, quality deterioration of wireless transmission path occurs and power consumption of both of network side and mobile machine side is increased due to the required location registration. Especially, the mobile machines which are battery-operated have to reduce the frequency of the location registration as much as possible in order to suppress the power consumption.

However, the above techniques cannot prevent the increase of the frequency of location registration when a large number of users carrying mobile machines move on a train or the like. Even in the technique of Japanese unexamined patent application publication No. 11-355835, location registration processings accompanied with the travel of a train are necessary and there is a problem that all of the location information of respective mobile machines have to be updated corresponding to such location registration processings.

SUMMARY OF THE INVENTION

It is an object of the present invention to prevent an increase of load on a network accompanied with an increase of location registration processings, an increase of power consumption, and deteriorations of transmission paths, by providing a configuration in which, when a large number of subscribers carrying mobile machines move on a train for example, location registration is conducted by using particular location information corresponding to the traveling route of the train completely without the location registration accompanied with the travel of the train.

A mobile communication network of the present invention comprises a plurality of base stations and a plurality of mobile machines, and further, the mobile communication network comprises at least a particular location information notifying unit.

Each mobile machine conducts location registration to the base station at a time when the mobile machine enters in the particular area, by using the particular location information.

According to the present invention, at a time when a mobile machine joins in a moving network e.g. a time when a user carrying the mobile machine gets on a train, location registration is conducted by using particular location information defined as a set of a plurality of conventional location information corresponding to a traveling route of the train without conducting any location registration processing while the mobile machine joins in the moving network so that the frequency of the location registration processings conducted over the entirety of the mobile communication network can be reduced greatly. Therefore, increase of load on the network and of the power consumption can be prevented, and the quality deteriorations in wireless transmission paths can be prevented.

BRIEF DESCRIPTION OF THE DRAWINGS

FIG. 2 explains a situation of location registration occurrence when many mobile machines move on a train or the like;

FIG. 8 is a flow chart of existence confirming processing of the moving network;

FIG. 9 is a flow chart of searching processings of the moving network;

FIG. 10 is a flow chart of processings for the joining in the moving network;

FIG. 11 explains the stored contents of moving network related information in a system information block in a first embodiment;

FIG. 15 shows an example of stored contents of an table for showing correspondence among the location information of mobile machine, moving network location information and conventional location information;

FIG. 16 shows an example of location information managing table of mobile machine;

FIG. 17 shows an example of a table showing correspondence between moving network location information and conventional location information;

FIG. 18 shows an example of a table showing correspondence between moving network location information and conventional location information for each radio network controller;

FIG. 22 shows correspondence between cell information and leaving point information;

FIG. 23 explains a format of pilot channel;

FIG. 29 explains a frequency of location registration in FIG. 28;

FIG. 31 is a flowchart of leaving processings from the moving network, and

DESCRIPTION OF THE PREFERRED EMBODIMENTS

Figure 1:
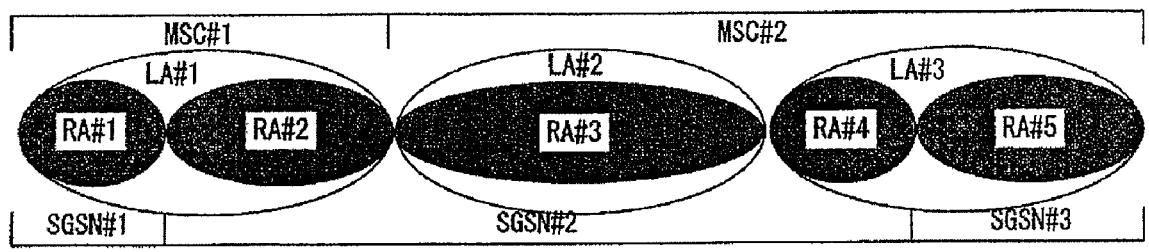
FIG. 1 shows a relationship between LAs and RAs in 3GPP system.
Figure 2:
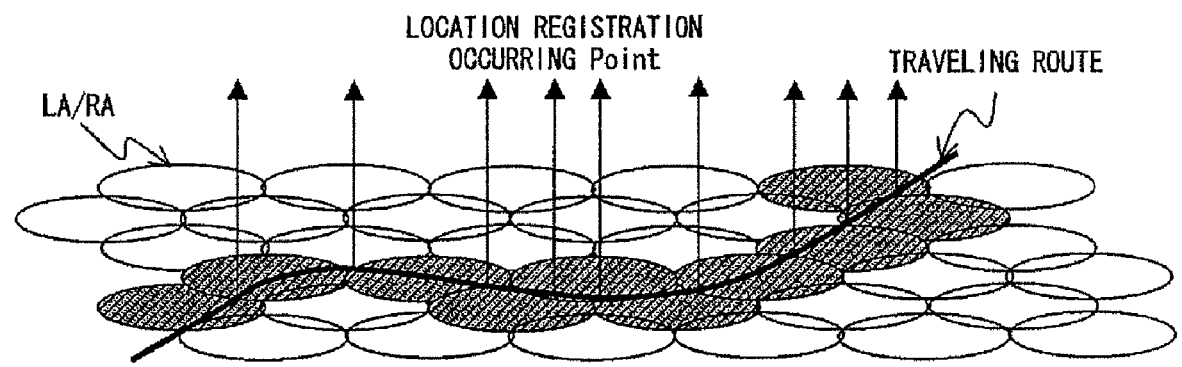
Figure 3:
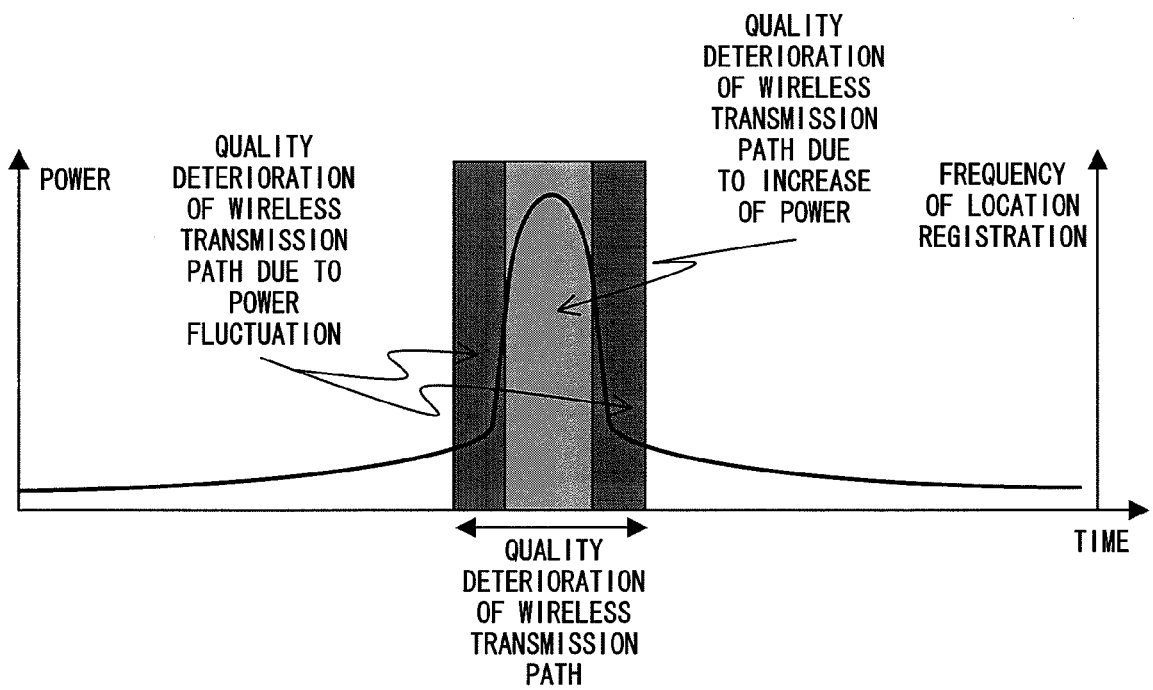
FIG. 3 explains quality deteriorations of wireless transmission path due to an increase of frequency of location registration.

Hereinafter, embodiments of the present invention will be explained in detail, referring to the drawings. As described above, in the present embodiments, a moving network is configured based on specifications of 3GPP system with the possible least modification to the 3GPP system. Also, the embodiments will be explained based on a principle that the moving network itself does not conduct location registration, mobile machines do not conduct location registration accompanied with the movement thereof while they join in the moving network, and the transmitting/receiving between the mobile machines and base stations are conducted not through such a device as a moving network device described later.

Figure 4:
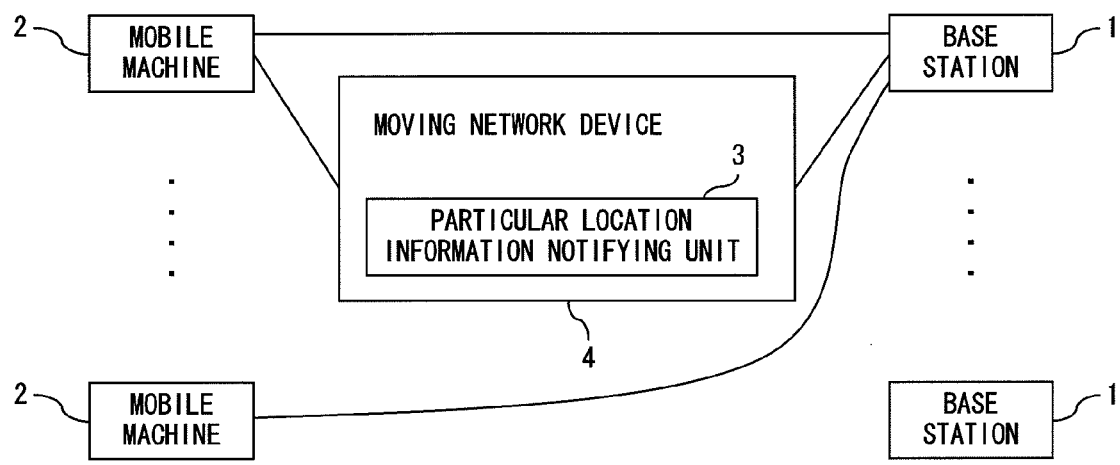
FIG. 4 is block diagram showing a principle of a mobile communication network of the present invention.

FIG. 4 is a block diagram showing a principle of a mobile communication network of the present invention. FIG. 4 is a block diagram showing a principle of a mobile communication network comprising a plurality of base stations 1 and a plurality of mobile machines 2. The mobile communication network further comprises at least particular location information notifying unit 3.

The particular location information notifying unit 3 supplies to the mobile machines 2 moving in the corresponding particular area a particular location information assigned to such a predetermined particular area as an area of traveling route of a train. Each mobile machine 2 conducts location registration to the base station 1 at a time when it enters in the particular area.

In the present invention, there can be a configuration in which the base station 1 reports to each mobile machine 2 parameters necessary for receiving information reported by the particular location information notifying unit 3 so that the mobile machine 2 receives the particular location information by using the parameters.

Also, the mobile machine 2 can conduct operations including transmitting and receiving by the conventional processings, without a concernment of the particular location information notifying unit 3.

Further, the particular location information notifying unit 3 can transmit a pilot signal which indicates the existence of the above predetermined particular area and the receiving of which can be used as one of location registration conditions for the base station 1 using particular location information conducted by the mobile machine 2.

Further, in the present invention, a configuration in which the particular location information notifying unit 3 is provided in a moving network device 4 existing among mobile machines 2 and base stations 1, constituting a moving network corresponding to the above particular area by the base stations 1, the moving network device 4 and the mobile machines 2 so that the mobile machines 2 can join in the moving network based on a location registration using the above particular location information.

In an embodiment of the present invention, there can be a configuration in which a mobile machine 2 joins in the moving network when the mobile machine 2 receives from a base station 1 a report signal for search of the moving network and receives from the moving network device 4 a moving network related information including the above particular location information by using the report signal. Or there can be a configuration in which the mobile machine 2 joins in the moving network when, in addition to the receiving of the moving network related information, the mobile machine 2 further detects the correspondence between GPS information included in the mobile machine 2 itself and joining point GPS information which is further included in the moving network related information. Or, there can be a configuration in which when, in addition to the above conditions, a receiving level of the pilot signal received from the moving network device 4 exceeds a predetermined threshold value, the mobile machine 2 joins in the moving network.

Further, in the embodiment of present invention, there can be a configuration in which when a receiving level of the pilot signal transmitted from the moving network device 4 falls less than a predetermined threshold value while the mobile machine 2 joins in the moving network, the mobile machine 2 conducts location registration using conventional location information of the current location thereof instead of the above particular location information and the mobile machine 2 leaves the moving network. Or there can be a configuration in which when the mobile machine 2 makes a comparison between a moving network joining continuation area corresponding to a leaving point GPS information and a GPS information included in the mobile machine 2 itself and detect that the mobile machine 2 has gotten out of the joining continuation area while the mobile machine 2 joins in the moving network, the mobile machine 2 leaves the moving network by conducting location registration using conventional location information.

Further, in an embodiment of the present invention, the above particular location information can be defined as a set of a plurality of conventional location information corresponding to a plurality of areas included in the above particular area. Further, in an embodiment, the core network side connected to the mobile communication network can comprises a mobile machine location information managing unit for managing the locations of mobile machines using the above particular location information, corresponding to the location registration to the base station conducted by the mobile machine 2. Further, the core network side can comprises a location information correspondence managing unit for managing the correspondence between the particular location information and a plurality of the conventional location information.

In an embodiment of the present invention, a radio network controller connecting the mobile communication network side and core network side can comprises a location information correspondence managing unit for managing the correspondence between the particular location information and a plurality of the conventional location information.

As described above, according to the present invention, location of each mobile machine is managed by using the particular location information defined as the set of a plurality of the conventional location information corresponding to the particular area, for example.

Figure 5:
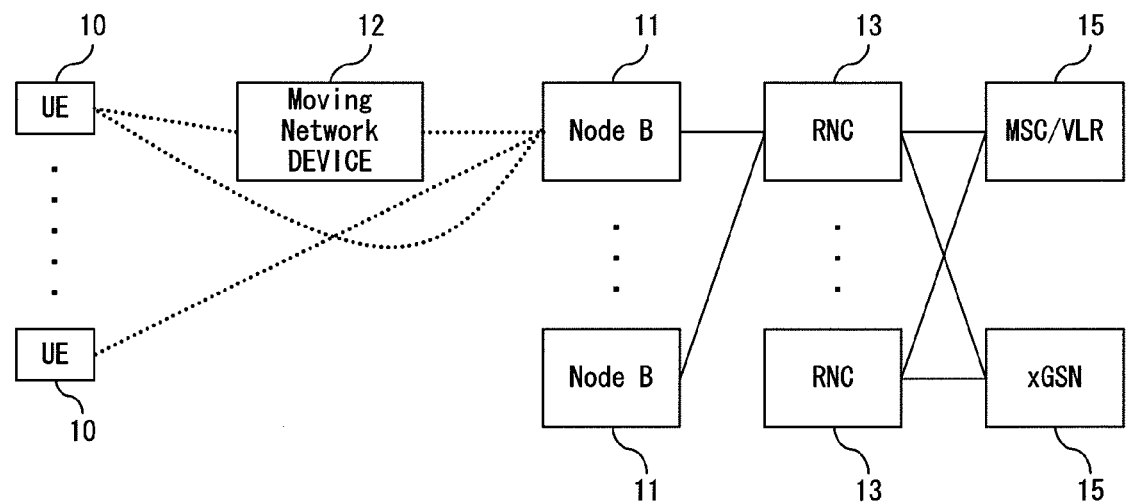
FIG. 5 is a block diagram showing a fundamental configuration of the mobile communication network of the present invention.

FIG. 5 is a block diagram showing the entire configuration of the mobile communication network including the moving network. In FIG. 5, the moving network including a moving network device 12 among UEs (user equipments) 10 and nodes B 11 is defined. Here, each node B11 means a base station in 3GPP and it is a node conducting wireless transmitting/receiving in a logical respect and is a wireless base station device in a physical respect. Further, in FIG. 5, physical moving network device 12 is provided among the UEs 10 and the nodes B11, however, this moving network device 12 may be logical, basically and can be implemented as a part of the wireless base station device as a node B11 or the like as a matter of course.

In FIG. 5, each node B11 i.e. each wireless base station device is connected to radio network controller RNC 13 for managing the resources or the like. Also, the RNC 13 is connected to a mobile switching center MSC 14, xGSN 15, above described SGSN or a gateway GPRS support node as a gateway node managing the access to the internet service providers. MSC 14 is provided with a visitor location register VLR.

Figure 6:
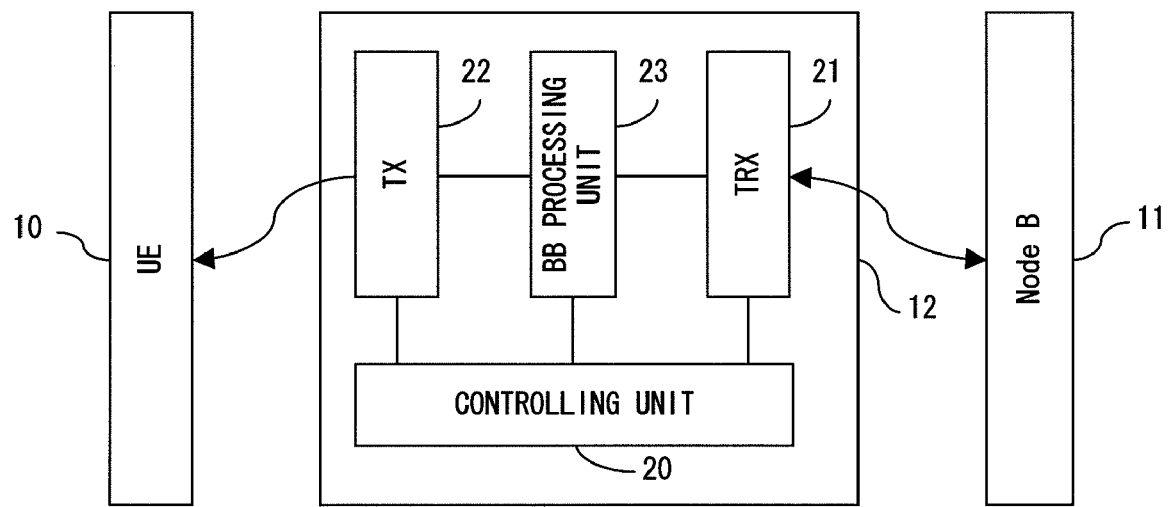
FIG. 6 shows a configuration example of a moving network device.

FIG. 6 is a block diagram showing a configuration example of the moving network device 12 of FIG. 5. In FIG. 6, the moving network device 12 comprises controlling unit 20 for controlling the entirety of the device, transmitting/receiving unit (TRX) 21 for transmitting and receiving between the node B11, transmitting unit (TX) 22 for transmitting to the UE 10, and a broadband processing unit 23 for conducting broadband (BB) processings. This configuration means that in the present embodiment, as a principle, bi-directional communications are conducted between the moving network device 12 and the node B11, while only downstream communications from the moving network device 12 to the UE 10 are conducted and upstream communications between the UE 10 and node B11 are conducted not through the moving network device 12.

The moving network (MN) device 12 comprises, as an indispensable function thereof, a function to report the system information about the moving network. Further, the moving network device 12 comprises a function just to transmit a physical channel transmitted from the node B11 side, and a function to add information as occasion demands. Also, the moving network device 12 comprises a reporting function of a pilot channel for notifying to the UE 10 the update of the information reported from the MN device 12 as described later, and a function to receive the report information from the node B11 and update a system information or the like as an optional function.

In an embodiment of the present invention, by defining a special location information with respect to the moving network, the UEs 10 conduct location registration using the special location information at a time when the UEs 10 joins in the moving network. Location information in UTRAN (Universal Terrestrial Radio Access Network) in 3GPP is defined by location areas LA with respect to a circuit switch or by routing areas RA with respect to a packet switch. The location information is managed by the core network and paging request is issued for the RNC 13 together with the location information managed in the core network side when a transmission is conducted to an UE 10, for example. The RNC 13 obtains the area to be reported about the request for receiving, corresponding to the paging request and conducts paging on the area.

In the present embodiment, the explanation below will be made based on an assumption that location areas LA and routing areas RA correspond to each other, for the sake of a simplicity, however, the scope of the present invention is not limited thereto.

Figure 7:
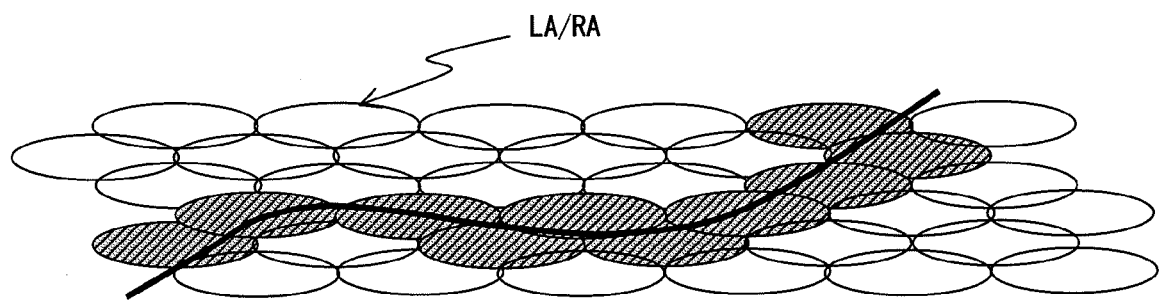
FIG. 7 explains the definition of location information with respect to the moving network.

In FIG. 7 explains an example of a definition of location information corresponding to the moving network. In FIG. 7, location areas $LA_{MN}$ corresponding to one moving network (MN) and routing areas $RA_{MN}$ correspond to each other. The location information is defined as a set of a plurality of LA/RA along the rails of a railroad for example. In other words, in FIG. 7, set of crosshatched circles is $LA_{MN}$ or $RA_{MN}$, and the definition image thereof is expressed by the following formula.

$$LA_{MN}/RA_{MN} = \Sigma LA_i/RA_i, \text{ where } LA=RA$$

In the core network side in FIG. 5 i.e. in the side of MSC14 and xGSN15, location information management register for managing the location of UEs 10, e.g. a VLR with respect to the MSC 14 the location management with respect to the moving network using such definitions with respect to the moving network is realized. By using such definitions, the moving network itself does not update the registered location even when a train travels for example, while the mobile machines in the moving network just conduct location registration by using the $LA_{MN}/RA_{MN}$ to the MN at the time of joining in the MN, without the necessity of location registration accompanied with the movement.

Next, the processings by the UEs at the time of the joining in the moving network will be explained, referring to FIGS. 8 to 10. As described above, each UE 10 conducts location registration by using the location information $LA_{MN}/RA_{MN}$ corresponding to the moving network at a time when users carrying the UEs 10 get on a train. And the processings for joining in the moving network is completed when the above location registration is conducted.

To join in the moving network, it is needed that the UE detects that the moving network exists around the current location of the UE, i.e. the UE is in a location near the set of the crosshatched circles as explained in FIG. 7 and the UE searches the value of the location registration information $LA_{MN}/RA_{MN}$ for the processings of the joining.

As described above, the information needed for joining in the moving network is basically supplied from the RNC 13 side of FIG. 5 as the system information, added by the moving network device 12 as needed, and is supplied to the UE 10.

As for a format of the system information supplied from the RNC 13 side via a node B11, the UE 10 is reported about the system information in which a common downstream channel for the report information transmission PCCPCH (Primary Common Control Physical Channel) is as a physical channel, in a format including a MIB (Master Information Block) and SIB (System Information Block) in the logical channel BCCH (Broad Cast Control Channel). In the present embodiment, information concerning the moving network is included in SIBs conventionally existing in plural. The information includes such information as scrambling code for obtaining the information reported by the moving network device 12.

A flow chart of the existence confirming processing of moving network of FIG. 8 will be explained before the detail of the above system information related to the moving network which will be explained referring to FIG. 11 further later. In FIG. 8, first, report information in the logical channel BCCH is transmitted from the RNC 13 side of FIG. 5. The UE 10 receives the SIB as the report information from the node B11 side to detect the existence of the moving network around the UE. When there exists the moving network, the UE 10 determines whether or not the UE can join in the moving network e.g. the user thereof are going to get on a train, and when joining is possible, the UE 10 conducts the searching of the moving network and when there is not a moving network, the UE 10 does not conduct any processing.

FIG. 9 is a flow chart showing searching processings for the moving network when it is determined that joining in the moving network is possible. When it is determined that joining in the moving network is possible, the UE 10 tries to receive the report information of the moving network i.e. the system information added by the moving network device 12 by using parameters being included in the SIB as described above and stored in the system information transmitted from the node B11 side. When the UE 10 can receive the information, the UE 10 conducts a processing for joining in the moving network, and when the UE 10 cannot receive the information, the UE 10 conducts the processing again.

FIG. 10 is a flow chart showing processings for joining in the moving network. In FIG. 10, the UE 10 receives the system information reported by the moving network i.e. the system information added by the moving network device 12 and determines whether or not the UE 10 is to join in the moving network. As described later, for example, when GPS information specifying the area which should join in the moving network is stored in the above system information, the UE 10 conducts comparison between the above GPS information and the GPS information included in the UE 10 itself in order to determine whether or not the UE 10 is to can join in the moving network depending upon whether or not the UE 10 has gotten in the area which join in the moving network. When the UE 10 is to join, the UE 10 conducts location registration by using the location information $LA_{MN}/RA_{MN}$ of the moving network. When the UE 10 is not to join, the UE 10 does not conduct any processing.

In FIGS. 8 to 10, the processings for joining in the moving network in the present embodiment is schematically explained. However, in the present embodiment, the UE 10 can receive the information about the location at which the UE 10 gets in the area which should join in the moving network i.e. GPS information of the ticket gate of the station in order to determine whether or not the UE 10 is to join in the moving network, assuming that there are cases where GPS information specifying the area which should join in the moving network is included in the system information added, by the moving network device 12, to the system information transmitted from the node B11 side and where such GPS information is not included in the system information.

There is a great difference between a configuration in which such GPS information specifying the area which should join in the moving network or the moving network joining continuation area for detection of the leaving from the moving network is supplied to the UE 10 by the system information added by the moving network device 12 and a configuration in which such GPS information is notified to the UE 10 by the joining/leaving point information notifying device installed at the ticket gate of station for example. Therefore, hereinafter, the case where the GPS information is notified as the system information added by the moving network device 12 is explained as a first example, and the case where the GPS information is notified at the ticket gate of station for example is explained as a second example.

Before the explanation of the first embodiment, joining conditions for the moving network of the present embodiment will be explained further. First, there are two preconditions about these joining conditions. The first precondition is that the UE 10 receives the information indicating the existence of the moving network around the UE 10 as the system information from the node B11 side. The second precondition is that the UE 10 can receive the system information added by the moving network device 12 or the information of a pilot channel transmitted from the moving network device 12 by using the contents of the above system information. In the present embodiment, just a satisfaction of these two preconditions satisfies the joining conditions for the moving network.

Further, as for the joining conditions for the moving network, individual conditions can be added to these preconditions. The first individual condition is that the UE 10 receives the GPS information specifying the point of joining in the moving network or the point of leaving from the moving network as the system information added by the moving network device 12 or as contents of a pilot channel transmitted from the moving network device 12 separately from the system information, and the UE 10 detects the correspondence between the GPS information included in the UE 10 itself and the GPS information from the moving network device 12 i.e. the UE exists at the joining point. A configuration can be employed in which a satisfaction of this individual condition along with the satisfaction of the above described two preconditions satisfies the joining conditions.

The second individual condition can be that UE 10 receives the GPS information specifying the joining point from the joining point information notifying device installed at ticket gate of station for example instead of the moving network device 12 side and the received GPS information corresponds to the GPS information included in the UE 10 itself and pilot pattern information from the moving network device 12 e.g. a pilot channel signal can be received, for example, with a receiving level exceeding a predetermined threshold value, as described later. A configuration can be employed in which a satisfaction of this individual condition along with the satisfaction of the above described two preconditions satisfies the joining conditions.

Also, in the first individual condition, the GPS information is to be received from the moving network device 12 and in the second individual condition, the information is to be received from the joining point information at ticket gate of station, however, the difference of the receiving ways is not essential condition and the correspondence of the GPS information to each other is the essential condition. For example, upon the determination of the second individual condition, the UE 10 can receive the GPS information from the moving network device.

Figure 12:
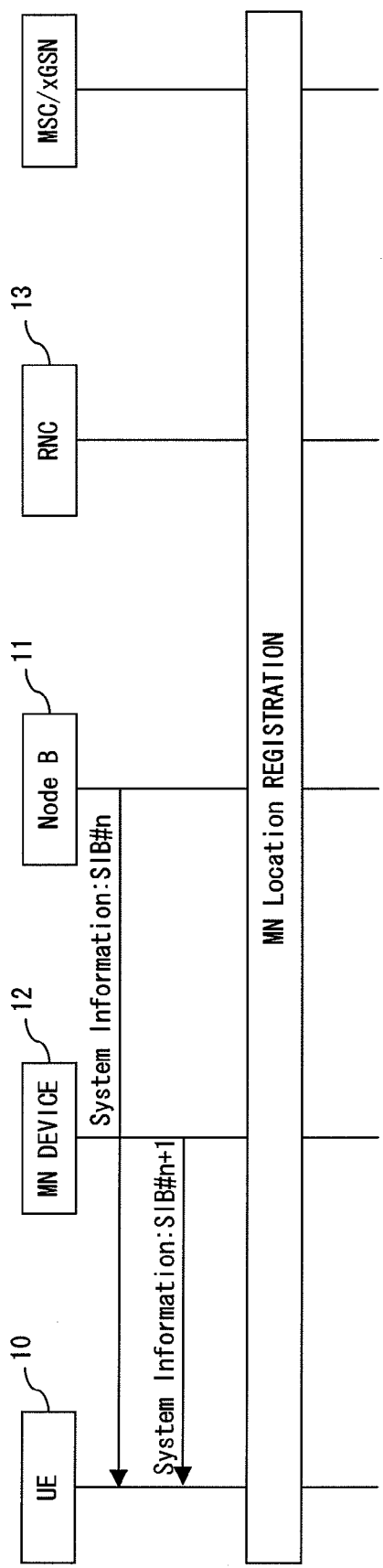
FIG. 12 explains a location registration sequence of moving network location information.

The first embodiment will be explained, referring to FIGS. 11 to 24. FIG. 11 explains the contents of the moving network related information notification using the system information in the first embodiment. FIG. 12 explains a location registration sequence conducted by the UE 10 corresponding to this notification of the moving network related information.

In this first embodiment, the GPS information or the like especially as the joining/leaving point is notified to the UE 10 among the moving network related information, being added to the system information or the like by the moving network device 12. To the contrary, in the second embodiment described later, for example, this GPS information is notified to the UE from the joining/leaving point information notifying device installed at the ticket gate of the station or without the concernment of the moving network device 12. However, the method of notification to the UE 10 from the moving network device 12 in the first embodiment is not limited to the method in which the GPS information is added to the system information to be notified. The GPS information can be notified to the UE 10 being stored in separate pilot channel, for example, naturally.

The system information block SIB included in a common down stream channel for the report information transmission PCCPCH includes n blocks such as blocks of SIB#1 to SIB#n at a time when it is transmitted from the node B11 to the moving network device 12. The SIB#n includes, as the moving network related information to be reported from the node B11 side to the UE 10, existence/inexistence of the moving network, $n+1_{th}$ block added by the moving network device 12 as a system information block, i.e. scrambling code for the decode of a common downstream channel for the report information transmission PCCPCH including the SIB#n+1, time offset information, information of pilot pattern and the like.

The moving network related information added by the moving network device 12 i.e. SIB#n+1 includes $LA_{MN}/RA_{MN}$ of the moving network ($LA_i/RA_i$ may be listed for this), type of the moving network i.e. the information about which way is used the GPS information or the pilot channel, or whether or not both of the above ways are used for the determination of the leaving from the moving network, the GPS information of the leaving point, notifying signal used in a case of the change of the leaving point which will be described later, and the like.

In FIG. 12, the system information blocks of SIB#1 to SIB#n+1 is transmitted from the node B11 to the UE 10 via the moving network device 12. From the moving network device 12, the system information block of SIB#n+1 is transmitted to the UE 10, being added. Corresponding to this, location registration is conducted by using the location information of the moving network from the UE 10 to the node B11 side. The location information is transmitted also to the RNC 13, MSC 14 and xGSN15 and the corresponding processings are conducted.

The UE 10 does not conduct location registration while it is in a area defined as the moving network e.g. while the user thereof is moving on the train, after the location registration using the location information of the moving network is conducted i.e. while it is in the moving network. Further, the moving network device 12 in FIG. 5 does not concern the transmitting/receiving of the UE 10 and transmitting/receiving of UE 10 i.e. paging is conducted through the RNC 13 and the node B 11 from the MSC 14 or the xGSN 15 side. The paging has to be conducted by converting the location information of the moving network to every location information in the set, corresponding to every conventional location information because UE 10 conducts location registration by using the location information of the moving network i.e. using the location information specifying the set of the conventional location information. This paging is conducted in the second embodiment described later in the same manner completely, however, the paging in the first embodiment is explained first as the order of explanations.

Figure 13:
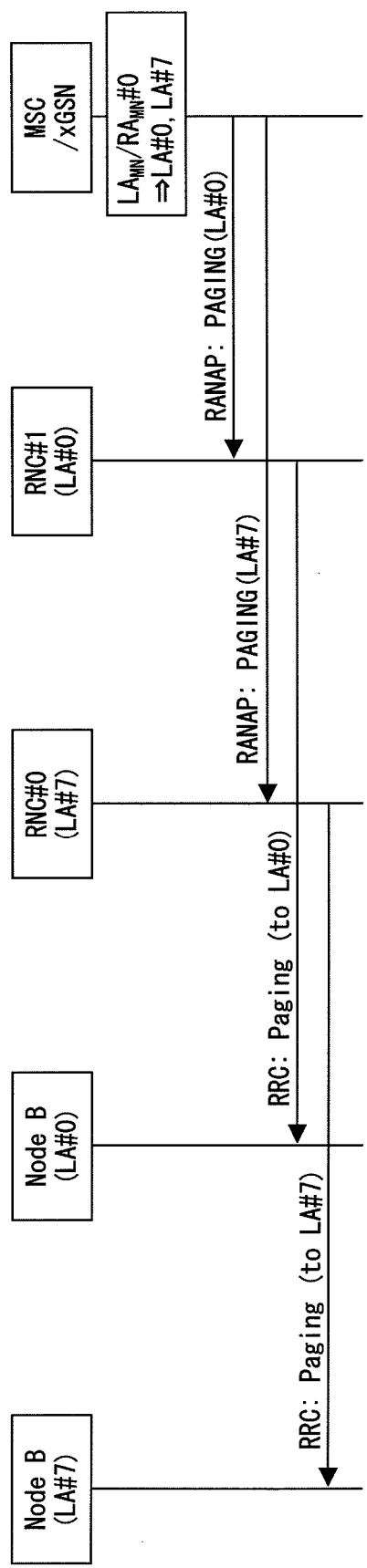
FIG. 13 explains a first example of sequence of paging processing.

FIG. 13 explains a first example of the paging sequence. In this first example, location information of the moving network and the correspondence between the location information and the corresponding conventional location information in the set are provided, as a correspondence table, in the core network side i.e. the MSC 14 and the xGSN 15 side. The MSC 14 or the xGSN 15 detects that the location information $LA_{MN}/RA_{MN}$#0 of the moving network is a set comprising the conventional location information LA#0 and LA#7 and transmits RANAP (Radio Access Network Application Part): paging to the RNC#1 corresponding to the LA#0 and the RNC#0 corresponding to the LA#7. Corresponding to this, respective RNCs transmits RRC (Radio Resource Control): paging to the nodes B corresponding to the LA#0 and LA#7 respectively and the paging is conducted to the UE 10 existing at any location in the area defined as the moving network.

Figure 14:
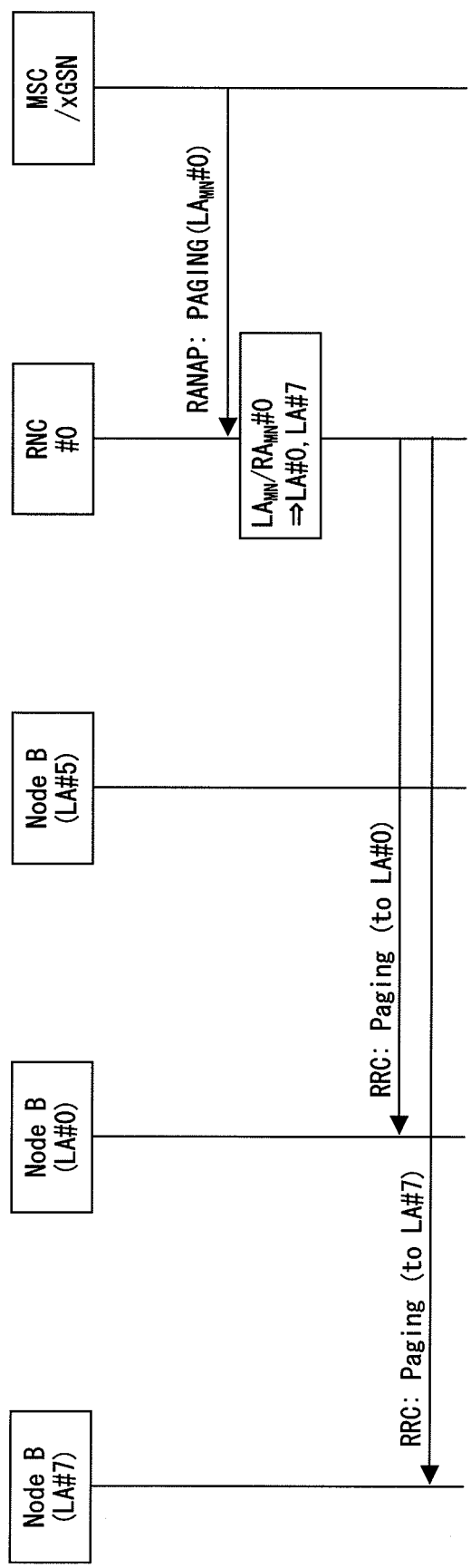
FIG. 14 explains a second example of sequence of paging processing.

FIG. 14 explains a second example of the paging sequence. In the second example, the RNC 13 of FIG. 15 comprises correspondence table specifying the correspondence between the location information with respect to the moving network and the conventional location information and the paging is conducted by using the contents of the table. In other words, the MSC 14 or the xGSN15 side transmits the RANAP: paging to the RNC#0 by using the location information $LA_{MN}$#0 of the moving network. The RNC#0 having received this transmits the RRC: paging to the nodes B corresponding to the conventional location information LA#0 and LA#7 corresponding to the moving network location information.

FIGS. 15 to 17 show examples of correspondence tables provided in the MSC 14 or the xGSN 15 side corresponding to the first paging example of FIG. 13, and an example of registered location management table corresponding to the UE 10. FIG. 15 explains a table which combines the registered location management table to the UE and the correspondence table with respect. In FIG. 15, "Validity/Invalidity of MN" is MN registration information which indicates whether the registered location information is valid or invalid, "Conventional location registration information" is location registration information of the UE before its joining in the moving network or after its leaving from the moving network. When MN is invalid, this conventional location registration information is made valid.

In FIG. 15, also the correspondence between the location information of the moving network (MN registration information) and the LA/RA information as the conventional location information is stored, however, it has nothing to do with the registration of the UE inherently, and the registered location managing table with respect to the UE and the correspondence table between the moving network location information and the LA/RA information can be separately provided as shown in FIGS. 16 and 17, as a matter of course.

In the second paging example explained in FIG. 14, the registered location managing table with respect to the UE is provided in the MSC 14/xGSN15 side, as in FIG. 16. In the RNCs 13, as in FIG. 18, tables showing the correspondence between the location information of the moving network and the conventional LA/RA information are stored. For example, in the correspondence table in the RNC#0 of FIG. 11, LA/RA information corresponding to $LA_{MN}$#0 and $RA_{MN}$#0 respectively as the location information of the moving network are stored.

Next, the updating of the system information while the UE 10 joins in a moving network will be explained, referring to FIG. 19. In FIG. 5, when updating the system information transmitted from the node B11 side to the UE 10, there are two possible cases i.e. the case where the moving network device 12 concerns the updating and the case where the moving network device 12 does not. The case where the moving network device 12 does not concern will be described later as the second embodiment, and the case where the moving network device 12 concerns is explained here.

Figure 19:
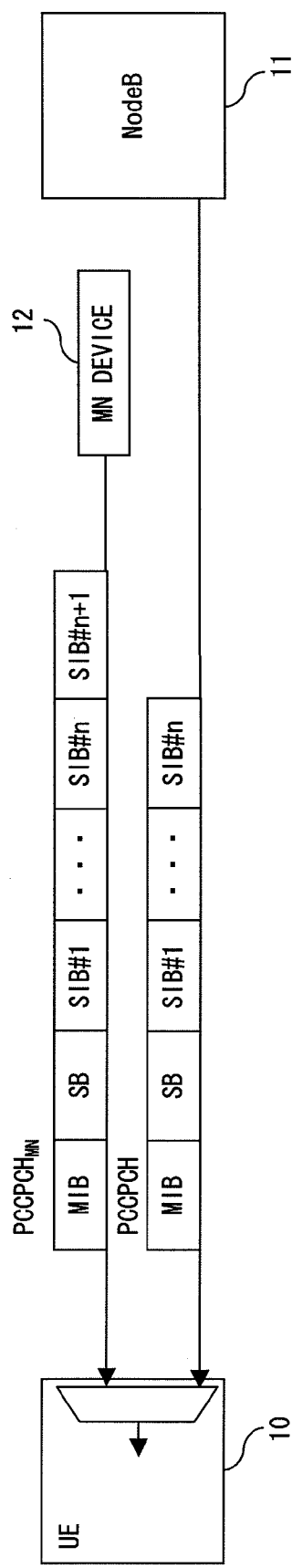
FIG. 19 explains a way of adding system information by a moving network device.

In a case where the system is based on 3GPP as explained in FIG. 11, there can be a configuration in which $PCCPCH_{MN}$ of the moving network, synchronized with PCCPC transmitted from the node B 11 in a chip level is defined and information including the above SIB#n+1 added thereto as moving network individual information is transmitted to the UE 10 side as shown in FIG. 19 so that the UE 10 can receive and also update system information reported from the node B 11 by receiving only report information from the moving network device 12 also during it joins in the moving network. Further, the moving network device 12 can relay to the UE 10 side, as it is, a common control channel SCCPCH (Secondary Common Control Physical Channel) used to transmit a paging signal transmitted from the node B 11 side and PICH (Paging Indication Channel) indicating the presence/absence of reception information.

Figure 20:
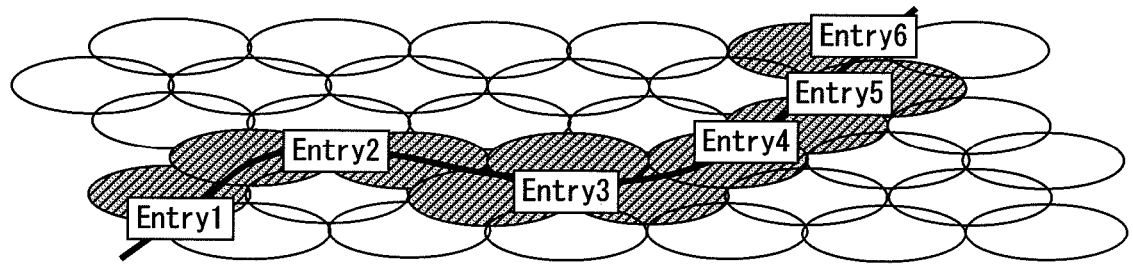
FIG. 20 explains an example of joining/leaving point with respect to the moving network.

Next, the way of notifying of the joining/leaving point information of the moving network to the UE 10 will be explained. FIG. 20 explains the locations of joining/leaving points of the moving network. The location information of the joining/leaving points is supplied as fixed information when the moving network is used. When applied to the railroad for example, the joining/leaving points are certainly installed at the stations without exception, therefore, the points can be set as the information unique to the moving network. In FIG. 20, corresponding to respective entries as the joining/leaving points, 4 corners of each rectangle are given as the coordinate points for example.

After joining of the UE 10 in the moving network, leaving point information has to be notified to the UE 10 in order to determine the leaving from the moving network. Also in the notification of such joining/leaving information to the UE 10, there are two possible cases i.e. the case where the moving network device 12 has a concernment and the case where the moving network does not. In the first embodiment, the way of the notification is explained assuming that the moving network device 12 has a concernment.

Also when the moving network device 12 concerns the notification of the joining/leaving point information, there are two possible cases i.e. the case where, upon joining in the moving network, the location information with respect to the all of the leaving points from the moving network is notified and the case where, upon joining, the location information of all of the leaving points is not notified and the information of the leaving point near the current location of the UE 10 is notified being accompanied with the movement of the UE 10.

When the location information with respect to the all of the leaving points from the moving network is notified upon joining, the GPS information of all of the leaving points are stored in the SIB#n+1 to be transmitted to the UE 10, as shown in FIG. 11. This leaving point GPS information is the GPS information corresponding to each entry explained in FIG. 20, for example. The UE 10 determines the leaving by the comparison between the notified leaving point GPS information and the GPS information included in the UE 10 itself.

When the location information with respect to the all of the leaving points from the moving network is not notified upon joining, the UE 10 has to receive the leaving point information near the current location of the UE 10 by keeping on receiving the information from the moving network device 12. Accordingly, the moving network device 12 updates the leaving point information as the train travels. One of the possible method thereof is that the leaving point information is updated at the time of the communication with the node B11 nearby, assuming that the moving network device 12 can have communications with the nodes B11.

Figure 21:
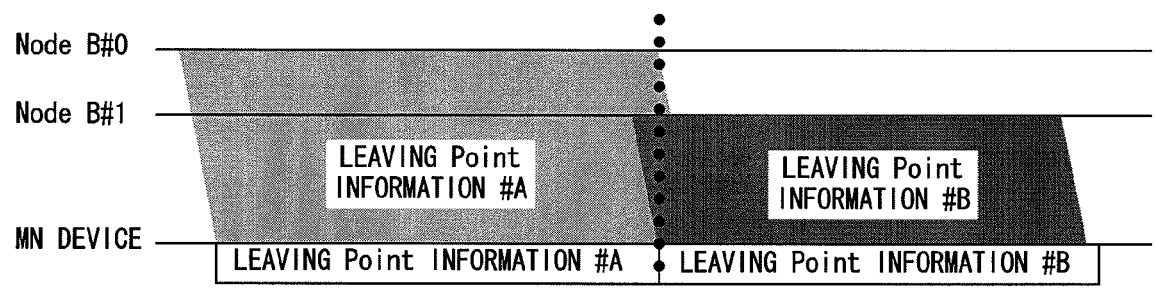
FIG. 21 explains a way of updating the leaving point information corresponding to the notification from node B.

FIG. 21 explains a way of updating the leaving point information in the moving network device 12 (a first way). In FIG. 21, the moving network 12 updates the leaving point information by receiving the leaving point information from each node B11 and detecting the discrepancy between the received information and the leaving point information included in the moving network device 12. In FIG. 21, the moving network device 12 holds leaving point information #A during the period in which the moving network device 12 can receive the leaving point information #A from the node B#0 and at a time when the moving network device 12 receives leaving point information #B from the node B#1, the moving network device 12 updates the leaving point information to the leaving point information #B.

FIG. 22 explains a way of updating the leaving point information in the moving network device 12 (a second way). The moving network device 12 is provide with leaving point information as a table in the moving network device 12 in advance, corresponding to the information of the cells covered by the nodes B in order to determine the timing of the update of the leaving point information. For example, as the train travels, the moving network device 12 receives cell information from another node B 11 in order to update the information to the leaving point information corresponding to the newly received cell information.

For example, firstly, leaving point information 15, 1F, 3F and 4B for the cell#AB covered by a node B is transmitted to the UE 10 from the moving network device 12 as report information. In this example, accompanied with the travel of the train to the area of cell#57, the cell information is received from the corresponding node B and the leaving point information is updated to 5A, 5E, 66, 71 and 7E.

The way in which the UE 10 receives this information when the moving network device 12 reports the update to the UE 10, while the moving network device 12 is updating the leaving point information will be explained, referring to FIGS. 23 and 24. FIG. 23 explains a way of change notification including, in a pilot channel, a notification indicating that a change of the report information is occurred. The UE 10 always observes the signal of this pilot channel and when notification of the occurrence of the change of the report information related to the moving network in the pilot channel, the UE 10 can obtain the updated leaving point information by receiving SIB#n+1 explained in FIG. 11, for example.

Figure 24:
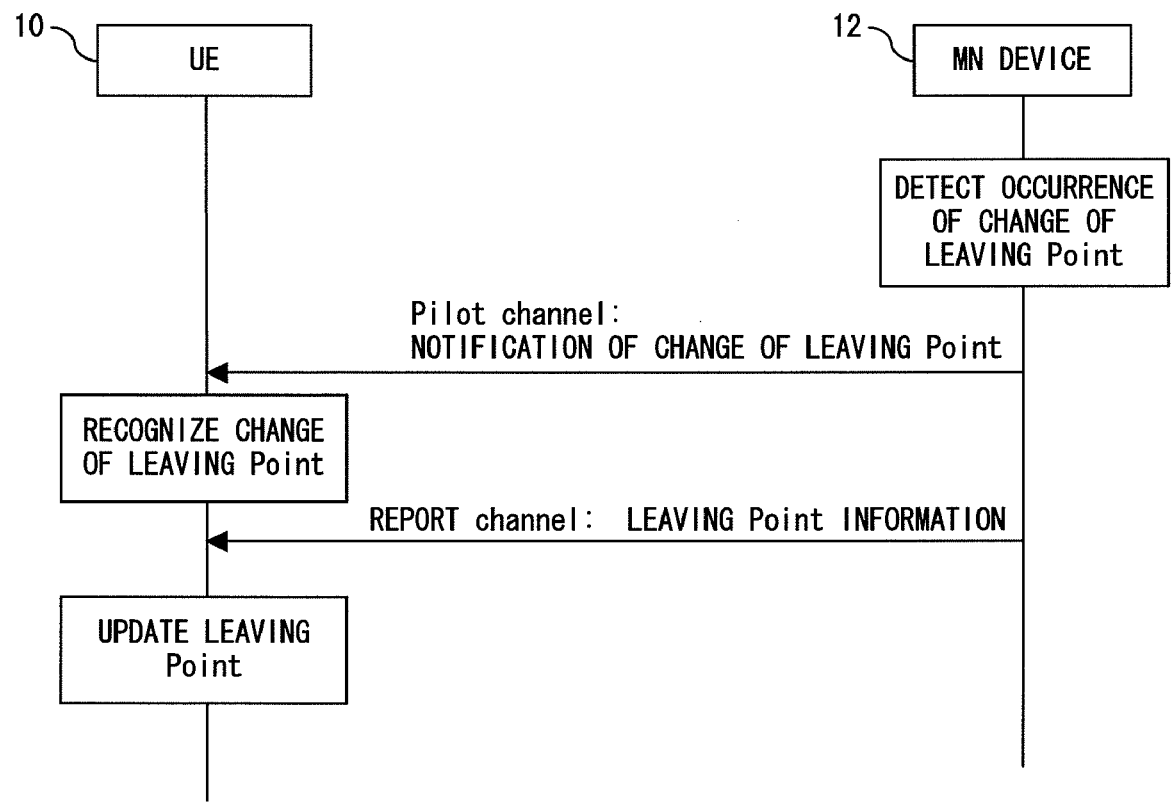
FIG. 24 explains a sequence of updating of leaving point information.

FIG. 24 explains a sequence of updating of the above leaving point information. In FIG. 24, the moving network device 12 notifies the change of the leaving point by using the pilot channel to the UE 10 at a time when it detects the occurrence of the change of the leaving point, and the moving network device 12 transmits to the UE 10 such a report channel as SIB#n+1, including the leaving point information as the result of the update. The UE 10 recognizes the change of the leaving point by the contents of the pilot channel and updates the leaving point information by using information in the SIB#n+1.

Further, in FIGS. 23 and 24, the UE 10 firstly observes the pilot channel and detects the notification of the change of the leaving point in order to receive the updated result of the leaving point information included in the SIB#n+1, for example, corresponding to the detected result. However, there can be a configuration in which the UE 10 periodically receives such report information from in the moving network 12 as the SIB#n+1 and updates the leaving point information when the leaving point information included in the received block and the leaving point information included in the UE 10 itself do not correspond to each other.

Next the second embodiment will be explained. As described above, the second embodiment is basically different from the first embodiment in that the UEs 10 do not receive the GPS information of joining/leaving point in a way concerned by the moving network device 12 but it receives the GPS information at ticket gates of the stations or the like. And only the correspondence between the received GPS information and the GPS information of the UE itself can be added to the conditions for joining in the moving network in addition to the above described two preconditions. Also, the condition that a receiving level of a pilot channel from the moving network device 12 exceeds a predetermined threshold value can be added to the condition in addition to the above conditions. However, the second embodiment will be explained by using the conditions with the added condition of the receiving level of the pilot channel.

As above, in the second embodiment, the condition that a receiving level from the pilot channel transmitted from the moving network 12 exceeds a predetermined threshold value is used for the joining/leaving of the moving network. For example, as the condition of leaving from the moving network, the condition of the comparison result between the leaving point GPS information transmitted from the moving network device 12 and the GPS information included in the UE 10 itself can be used, as explained in the first embodiment. Also, the condition that a report information transmitted from the moving network device 12 such as SIB#n+1 or a pilot channel including report information change occurrence notification as shown in FIG. 23 can not be received can be used. Also, the condition including both of the discrepancy of the GPS information and the impossibility of the receiving of the report information from the moving network device 12 can be used. However, the condition using the comparison between the receiving level of the pilot channel and the threshold value about it will be explained, referring to FIGS. 25 and 26.

Figure 25:
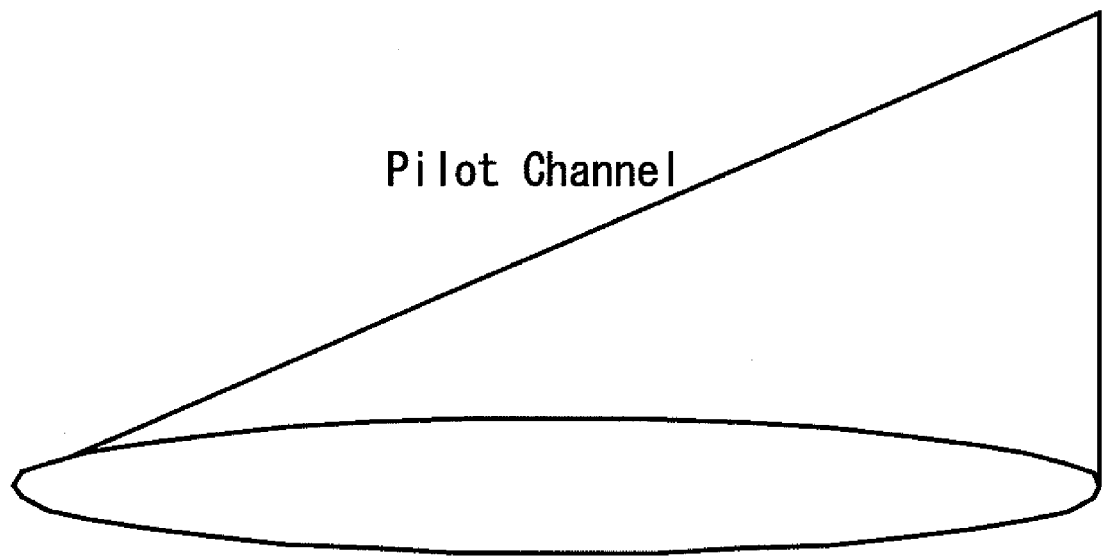
FIG. 25 explains an area which receives pilot channel in the second embodiment.

FIG. 25 explains an area which receives pilot channel. In FIG. 25, assuming that the moving network 12 exists on the extreme right to transmit a pilot channel, the receiving level of the pilot channel in the circle is lowered as the distance from the moving network device 12 becomes longer.

Figure 26:
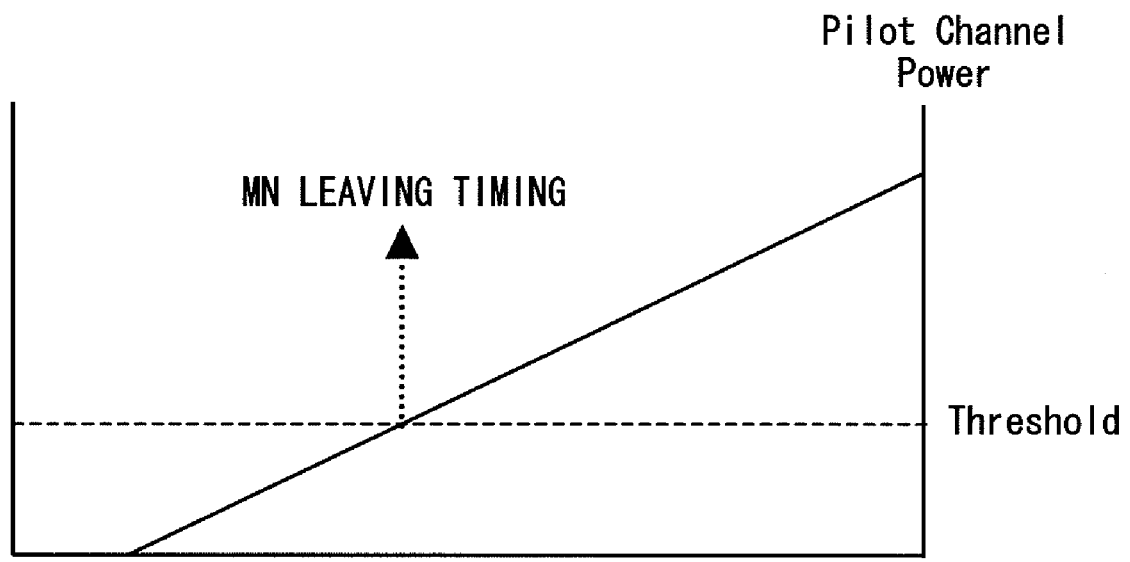
FIG. 26 explains a threshold value with respect to a receiving level of the pilot channel.

FIG. 26 shows a power of the pilot channel on a abscissa axis which expresses the location. Assuming that it is determined to be a condition of leaving from the moving network that the power fall less than a predetermined threshold value, the UE 10 has to always receive the pilot channel from the moving network 12 while being in the moving network.

Figure 27:
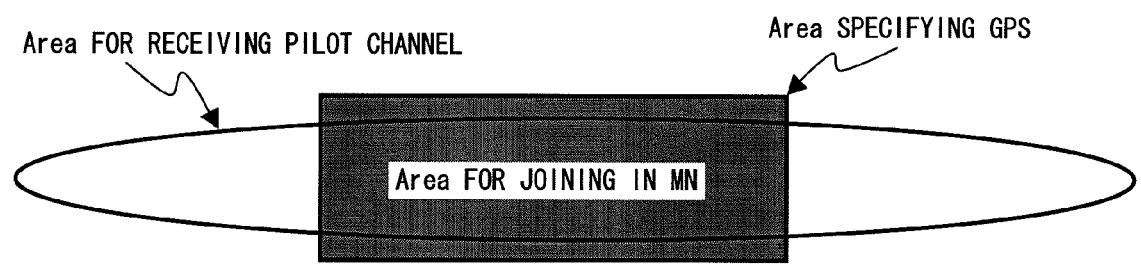
FIG. 27 explains a way of setting joining condition in the moving network corresponding to correspondence of GPS information and receiving level of pilot channel.

FIG. 27 explains a way of setting a joining condition in the moving network in the second embodiment. As shown in FIG. 27, GPS specified area as a joining area is expressed in rectangle. And as shown in FIG. 26, pilot channel receiving area in which the receiving power of the pilot channel exceeds a predetermined threshold value is expressed in a narrow oval. The moving network joining area in which UE 10 should join in the moving network is set as a portion where these figures overlaps each other. For example, when a user gets on a train, the UE 10 is on a platform of the station without exception, and if the condition that the UE 10 is on a platform is set, joining in the moving network can be prevented simply even when the receiving area of the pilot channel from the moving network device 12 got broader than expected.

In the second embodiment, determination about leaving from the moving network is conducted by the comparison between leaving point GPS information obtained at the ticket gate or the like and GPS information included in the UE 10. In this case, the joining area in the moving network and a moving network joining continuation area can be identical to each other and they can be different from each other. The case where they are different from each other will be explained, referring to FIG. 28 to 30.

Figure 28:
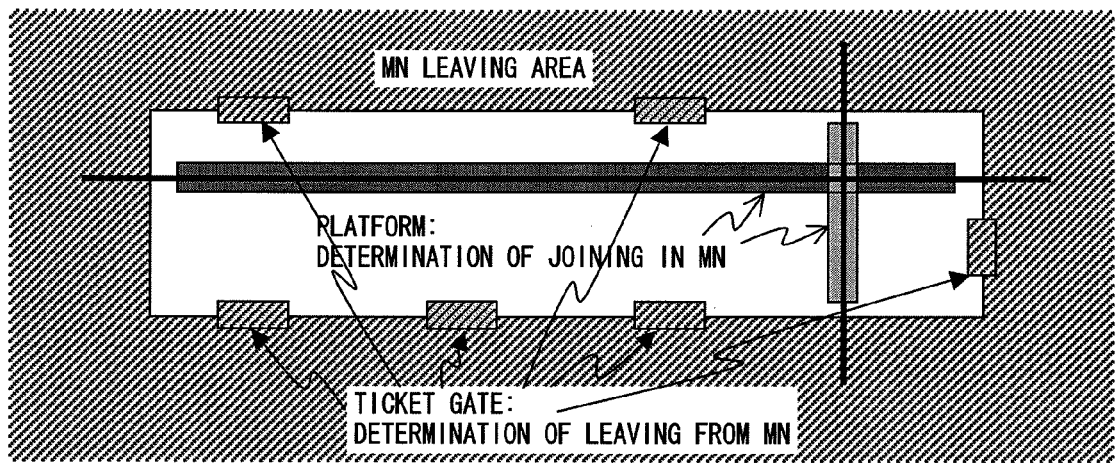
FIG. 28 explains a concrete example of a case where a joining area and a joining continuation area of the moving network are different.

FIG. 28 shows a relationship between a joining area and the joining continuation area of the moving network in a case where a platform or the like is the joining area and the area including the platform and the ticket gates around the platform is the moving network joining continuation area. There can be a configuration in which when joining/leaving of the moving network of a train or the like is conducted, a determination about joining is conducted at a platform as the joining area and a determination about leaving is conducted at a ticket gate when leaving from the moving network.

In a case where the joining/leaving point information is notified to UE 10 at a gate like a ticket gate as described above, the joining point information can be notified at gates at which joining in the moving network and the moving over the two moving networks are expected and leaving point information can be notified at gates at which leaving from the moving network is expected.

FIG. 29 explains moving network location registration for the arrangement of FIG. 28. When a user carrying UE 10 changes trains from a train stopped at a platform in a horizontal direction to a train stopped at a platform in a vertical direction, leaving is not determined and location registration is not conducted while the user is moving in a area corresponding to the platform colored in white, being remained to join in the moving network A corresponding to the horizontal platform. And when the user enters in the platform in a vertical direction, the location registration using the location information of the moving network B corresponding to that platform is conducted. Thereby, the location registration due to the leaving from the moving network can be omitted. In this case, the UE 10 is in a status to receive only report information from the node B without receiving report information from the moving network device 12 while moving between the platforms, even when the report information from the moving network device 12 can be received as shown in FIG. 29.

Figure 30:
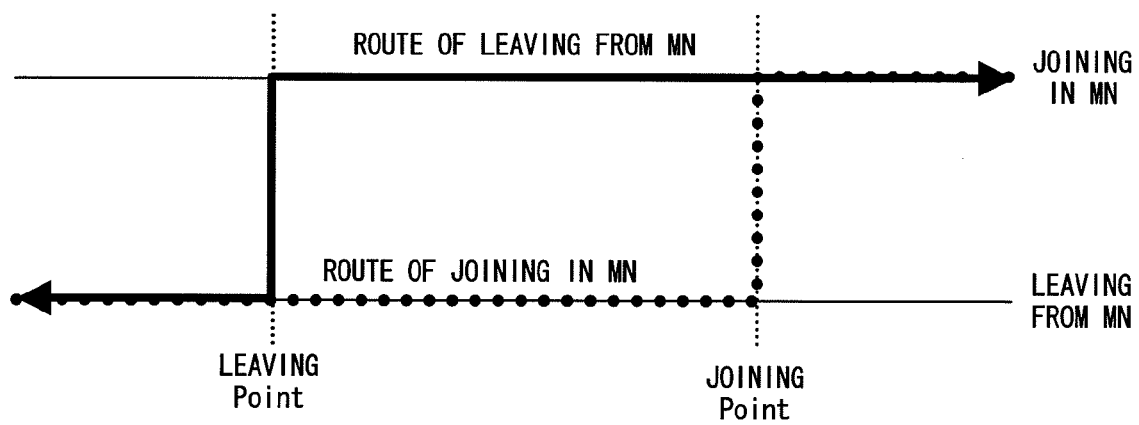
FIG. 30 explains hysteresis characteristics of the joining/leaving of moving network.

FIG. 30 explains hysteresis characteristics of joining/leaving in a case where the joining area and the moving network joining continuation area are different from each other as shown in FIG. 28. A route for joining in the moving network and a route for the leaving out from the moving network is different, corresponding to the location on a moving route of the UE 10 by setting the joining point to be different from the leaving point as shown in FIG. 30 so that hysteresis characteristics are realized and the repeated occurrences of joining/leaving is prevented which can happen in case that the joining area and the moving network joining continuation area are identical to each other.

FIG. 31 is a flowchart of leaving processings from the moving network in the second embodiment. In FIG. 31, the determination about the leaving is conducted with the condition that the receiving level of the pilot channel falls less than a predetermined threshold value and the condition of the monitoring of the leaving area (area out of the moving network joining continuation area) by the comparison of GPS information as shown in FIG. 26.

In FIG. 31, firstly the monitoring of the receiving level of the pilot channel reported from the moving network device 12 and the leaving area by using GPS information is conducted. When the pilot channel can not be received, i.e. the receiving level is lower than a predetermined threshold value, whether or not the UE 10 is in a leaving area is determined. When the UE is in the leaving area, location registration is conducted by using conventional location information in order to leave the moving network and when the UE is not in the leaving network, the state is hold as it is.

When the it is determined that the UE 10 is in the leaving area, it is determined whether or not the pilot channel can be received and whether or not its receiving level exceeds a predetermined threshold value. When the pilot channel cannot be received, the leaving from the moving network is conducted, i.e. location registration using conventional location information is conducted. When the pilot channel can be received, the state is hold as it is.

Figure 32:
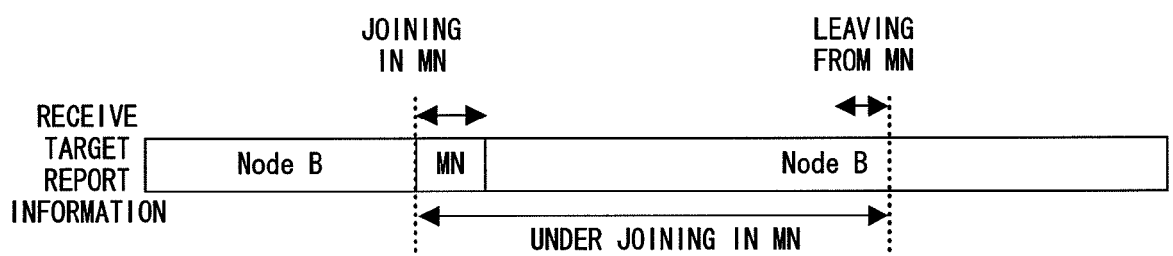
FIG. 32 explains a format of receiving system information when the moving network does not concern.

FIG. 32 explains a way of update of system information in comparison with the way in FIG. 19 for the first embodiment. In the second embodiment, the notification of the leaving point information is conducted at the ticket gates of the stations or the like so that the report information from the moving network device 12 such as the SIB#n+1 do not have to be received basically after joining in the moving network. Therefore, the receiving just of the report information from the node B 11 is enough. Accordingly, as shown in FIG. 32, the UE 10 can receive the result of the update of the system information by receiving the report information from the node B until the UE 10 detects the leaving from the moving network, while the UE 10 joins in the moving network.

What is claimed is:

1. A mobile terminal used in a mobile communication system, comprising:
    a receiving unit for receiving a joining condition that relates to a location and that is a condition for joining in a state in which location registration is regulated such that even if a change of a location registration area is detected, the location registration is not conducted during time extending from when location registration by using location information assigned to a fixed area overlapping or including a plurality of location registration areas is conducted to when a leaving condition is satisfied;
    a measurement unit for measuring a location of the mobile terminal; and
    a controlling unit for performing control such that location registration by using the location information assigned to the fixed area is conducted when the location satisfies the joining condition.

2. The mobile terminal according to claim 1, wherein
    the leaving condition is a condition that relates to a location, and
    a location satisfying the joining condition and a location satisfying the leaving condition are set at different locations.

3. The mobile terminal according to claim 1, wherein
    the plurality of location registration areas are a plurality of location areas or a plurality of routing areas.

4. A method of location registration for a mobile terminal used in a mobile communication system, the method comprising:
    receiving a joining condition that relates to a location and that is a condition for joining in a state in which location registration is regulated such that even if a change of a location registration area is detected, the location registration is not conducted during time extending from when location registration by using location information assigned to a fixed area overlapping or including a plurality of location registration areas is conducted to when a leaving condition is satisfied;
    measuring a location of the mobile terminal; and
    performing control such that location registration by using the location information assigned to the fixed area is conducted when the measured location satisfies the received joining condition.

5. The method according to claim 4, wherein
    the leaving condition is a condition that relates to a location, and
    a location satisfying the joining condition and a location satisfying the leaving condition are set at different locations.

6. The method according to claim 4, wherein
    the plurality of location registration areas are a plurality of location areas or a plurality of routing areas.

7. A radio device, comprising:
    a receiving unit for receiving information used for a determination of satisfaction of a condition for a mobile terminal, other than a determined relative location of the mobile terminal to a registration area, to leave a state in which location registration is regulated, from any of a plurality of wireless base stations arranged at different locations;
    a transmitting unit for transmitting the information received by the receiving unit; and
    a controlling unit for performing control such that the information transmitted by the transmitting unit is updated in accordance with a change in the information received by the receiving unit.

8. A radio device, comprising:
    a storing unit for storing a correspondence between cell information and information used for a determination of satisfaction of a condition for a mobile terminal to leave a state in which location registration is regulated;
    a receiving unit for receiving the cell information from a wireless station; and
    a transmission controlling unit for performing control such that information to be transmitted is updated to correspond to the cell information received by the receiving unit and is transmitted to a mobile terminal, when a change is detected in the cell information received by the receiving unit.

\* \* \* \* \*